United States Patent [19]

Kubo

[11] Patent Number: 4,522,412
[45] Date of Patent: Jun. 11, 1985

[54] OIL RING WITH COIL EXPANDER

[75] Inventor: Yukihiko Kubo, Okaya, Japan

[73] Assignee: Keikoku Piston Ring Co., Ltd., Tokyo, Japan

[21] Appl. No.: 618,766

[22] Filed: Jun. 11, 1984

Related U.S. Application Data

[63] Continuation of Ser. No. 436,811, Oct. 26, 1982, abandoned.

[51] Int. Cl.³ .............................. F16J 9/06; F16J 9/20
[52] U.S. Cl. .................................... 277/138; 277/163; 277/224
[58] Field of Search ................................ 277/138–141, 277/157, 163, 216, 224

[56] References Cited

U.S. PATENT DOCUMENTS

| | | |
|---|---|---|
| 2,631,908 | 3/1953 | Teetor . |
| 3,066,943 | 12/1962 | Brenneke . |
| 3,467,397 | 9/1969 | Sugahara ........................ 277/163 X |
| 3,795,403 | 3/1974 | Sugahara . |
| 4,045,036 | 8/1977 | Shunta ................................ 277/138 |
| 4,085,490 | 4/1978 | McCormick et al. . |
| 4,161,321 | 7/1979 | Hendrixou et al. ................. 277/216 |
| 4,214,762 | 7/1980 | McCormick et al. .............. 277/138 |

FOREIGN PATENT DOCUMENTS

| | | | |
|---|---|---|---|
| 2412186 | 9/1974 | Fed. Rep. of Germany ...... 277/138 |
| 446646 | 7/1965 | Japan ................................ 277/163 |
| 55-96344 | 7/1980 | Japan ................................ 277/138 |
| 1413292 | 11/1975 | United Kingdom ............... 277/139 |

Primary Examiner—Robert S. Ward
Attorney, Agent, or Firm—Paul & Paul

[57] ABSTRACT

A piston ring comprising a generally I shaped oil-scraping oil ring which has upper and lower side rails and a considerably thin web connecting the side rails, and which has an outer peripheral channel for receiving scraped oil and an inner peripheral groove for receiving coil expander, and an annular coil expander which is located in the inner peripheral groove so that the coil expander bears against the upper and lower side rails substantially at two points, the coil expander being spaced from the web of the oil ring with a slight gap therebetween.

12 Claims, 8 Drawing Figures

OIL RING WITH COIL EXPANDER

This application is a continuation of application Ser. No. 436,811, filed 10/26/82, now abandoned.

BACKGROUND OF THE INVENTION

1. Field of the Invention

This invention relates to a piston ring for an internal combustion engine and, in particular, to an oil ring having a coil expander for scraping excess oil from a cylinder wall.

2. Description of the Prior Art

In general, piston rings are placed between pistons and inner walls of engine cylinders. In automobile engines, these piston rings usually include one or two oil rings per piston for scraping excess oil from the cylinder walls. An oil ring must always bear against the cylinder wall. For this purpose, an oil ring is provided with a coil expander which forces the associated oil ring out against the cylinder wall.

An oil ring usually consists of upper and lower side rails and a web connecting the two side rails. The side rails and the web define an outer peripheral channel of the oil ring for receiving the scraped oil. They also define an inner peripheral groove of the oil ring for receiving the annular coil expander. The web of the oil ring is provided with a plurality of elongated oil vent holes which allow scraped oil to pass from the outer peripheral channel into the inner peripheral groove.

The scraped oil passes from the inner peripheral groove and piston peripheral groove into the piston through oil drain holes provided in a peripheral groove of the piston. The oil is then returned to an oil pan of an engine.

In the prior art, the inner peripheral groove of the oil ring, which is usually made of cast iron, usually has had an archwise sectional shape complementary to the circular sectional profile of the coil expander. As a result, the coil expander cam into considerable surface contact with the inner peripheral groove. Too much surface contact between the coil expander and the oil ring, however closes the oil vent holes to a large extent. This prevents the smooth passage of the oil scraped by the oil ring from the outer peripheral channel to the inner peripheral groove, i.e., into the peripheral groove of the piston. In some cases, the oil vent holes are completely clogged with oil sludge. This consequently reduces the oil scraping effect of the oil ring. The decrease of the oil scraping effect results in an increse of oil consumption.

Further, as the conventional oil ring has been usually made of cast iron, it could not be made light in weight, because the lower strength of cast iron meant the thickness of the web of the oil ring could not be decreased. Furthermore, in case of a cast iron oil ring having a coil expander which comes into considerable surface contact with the archwise periphery of the oil ring, the coil expander may be thrust totally into the archwise periphery of the oil ring due to wear of the oil ring.

SUMMARY OF THE INVENTION

The primary object of the present invention is to eliminate the abovementioned drawbacks. This is done by providing the oil ring which has an angular, rather than archwise, inner peripheral groove for receiving the coil expander. The coil expander contacts the walls which define the inner peripheral groove at only two points as seen in cross-section, in such a way that a slight gap is formed between the coil expander and the web of the oil ring. Different sizes of coil expanders can be stably held by and between the walls of the oil ring, because of the two-point contact. In the invention, the oil ring presents a substantially I shape section similar to railway rails.

Two-point contact between the oil ring and the coil expander would, however, normally increase the wear of the oil ring in comparison with the substantial surface contact of the prior art, since the pressure acting on the oil ring by the coil expander is inversely proportional to the area of contact between the two elements. To effectively prevent such increased wear of the oil ring, in the present invention, the oil ring can be made of steel or the like instead of the usual cast iron. Furthermore, the surfaces of the oil ring contacting the coil expander and the surface of the coil expander contacting the oil ring can be treated for wear resistance. The coil expander can be provided with a flat surface portion which comes into contact with the inner periphery of the oil ring in order to increase the contacting surface area between the coil expander and oil ring, thereby to decrease wear of the oil ring and the prevent the coil expander from thrusting into the inner periphery of the oil ring. By the provision of a steel oil ring, the web can be thinner in comparison with a cast iron oil ring, which cntributes to increasing flexibility of the oil ring. The side rails which are a rigid mass are connected to the thinner web and, accordingly, the oil ring can follow the inner peripheral profile of the cylinder wall, presenting a high oil scraping effect. The rigid side rails prevent the oil ring from deforming and provide a predetermined contact pressure against the cylinder wall.

BRIEF DESCRIPTION OF THE DRAWINGS

The invention will be described below in detail with reference to the accompanying drawings illustrating preferred embodiments of the invention. In the drawings.

DESCRIPTION OF THE PREFERRED EMBODIMENTS

Figure 1:
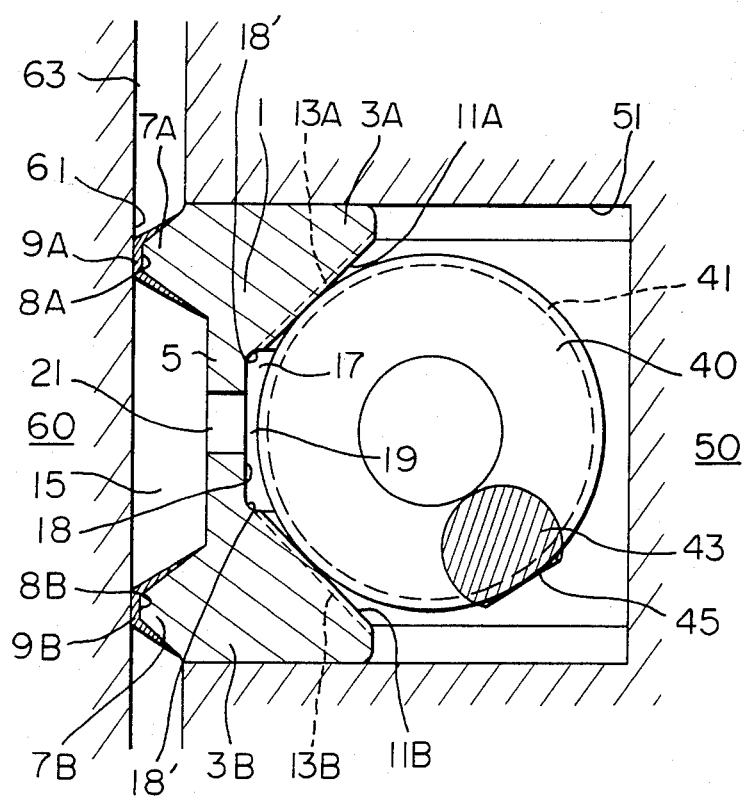
FIG. 1 is a partial sectional view of an oil ring with a coil expander, according to one embodiment of the present invention, located between a piston and the wall of the cylinder in which the piston reciprocates.
Figure 2:
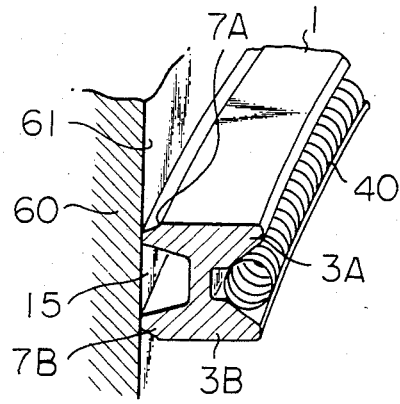
FIG. 2 is a partial perspective view of the oil ring with a coil expander shown in FIG. 1.

FIGS. 1 and 2 show an oil ring 1 with a coil expander 40, according to the present invention, used in a diesel engine. The oil ring 1 with the coil expander 40 is located in a peripheral groove 51 of a piston 50 of the engine. The piston 50 reciprocates in a cylinder bore 63 of a cylinder 60. The oil ring 1 is made of a single piece and has an upper rigid side rail 3A, a lower rigid side rail 3B and a thin and preferably straight web 5 connecting the side rails 3A and 3B, so that the oil ring 1 presents a substantially I shape section. The side rails 3A and 3B have peripheral outer projecting ends 7A and 7B which bear upon and slide against the inner wall 61 of the cylinder 60 when the piston 50 reciprocates. The outer ends 7A and 7B are preferably provided with surface treated layers 9A and 9B to decrease wear thereof.

The layers 9A and 9B are composed of, for example, chrome plating, or composite plating having a base of nickel, chrome, or iron having boride, carbide, nitride, or the like dispersed therein, or a plasma sprayed single or mixed layer or molybdenum, self fluxing alloy, stainless steel, or ferrochrome alloy, or the like. Nickel, chrome, or iron having boride, carbide, nitride or the like dispersed therein can be added to the plasma layer, if necessary, provided that the layers prevent wear of the corresponding cylinder wall. When the plasma sprayed layer is provided on the outer peripheral ends 7A, 7B, an undercoat made of Ni-Al (nickel-aluminide) or the like is preferably applied to the plasma sprayed layer. Alternatively, the layers 9A and 9B can be treated by quenching or nitriding or sulfurizing-nitriding. The quenching includes induction hardening or laser hardening. The nitriding includes ion-nitriding or soft nitriding in gas or in a salt bath.

Figure 4:
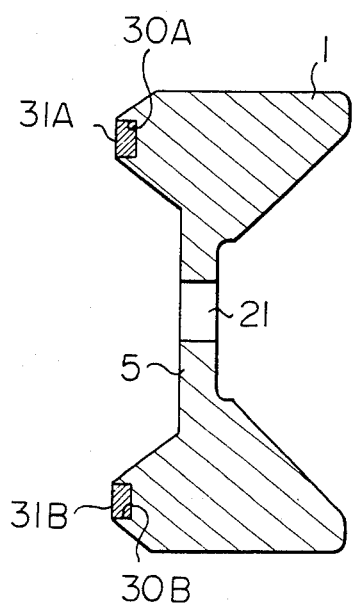
FIG. 4 is a sectional view of an oil ring according to another embodiment of the invention.

Alternatively, as shown in FIG. 4, the peripheral outer ends 7A and 7B can be provided with grooves 30A and 30B which are filled with wear resistance materials 31A and 31B similar to those of the surface treatment layers 9A and 9B.

Preferably, the peripheral outer ends 7A and 7B have a trapezoidal shape in section, as shown in FIG. 1. The trapezoidal shape has a narrow flat bearing surface 8A (or 8B) with sharp edges ensuring the outer ends 7A and 7B scrape the oil on the cylinder wall 61. The surface area of the flat bearing surfaces 8A and 8B can be considerably decreased and the flexibility of the oil ring is totally increased because of the thinner web 5, so that the flat bearing surfaces having a decreased surface area ensure a required and uniformly distributed unit pressure against the cylinder wall. When the outer ends 7A and 7B have the wear-resistant layers 9A and 9B, the flat bearing surfaces 8A and 8B are, of course, provided on the layers 9A and 9B.

The oil ring 1 has an outer peripheral channel 15 which is defined by the side rails 3A; 3B and the web 5 and which is adapted to receive the oil scraped by the outer ends 7A and 7B. The oil ring 1 also has an inner peripheral groove 17 which is defined by the side rails 3A, 3B and the web 5. The opposed walls of the side rails 3A and 3B that define the groove 17 are made of inclined flat surfaces 11A and 11B, according to one embodiment of the invention. Extensions of the inclined surfaces 11A and 11B intersect at an angle of 60° to 120°, preferably 90°. The inclined surfaces 11A and 11B, which rub against the coil expander 40 due to the elasticity or flexibility of the latter, can be treated for wear resistance at areas 13A and 13B, respectively. The wear resistance surface treatment can be, for example, chrome plating or nitriding (including sulfurized-nitriding).

Figure 3A:
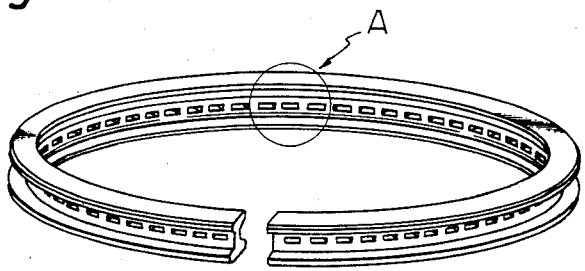
FIG. 3A is a perspective view of the oil ring shown in FIG. 1 without a coil expander.
Figure 3B:
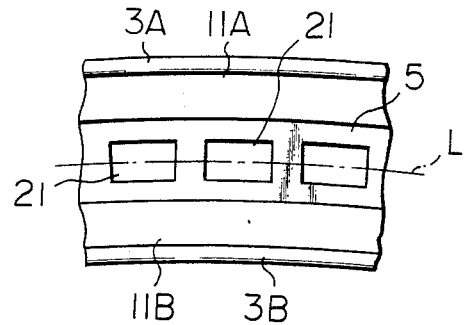
FIG. 3B is an enlarged view of a part A shown in FIG. 3A.

The oil ring 1 is provided with a number of small round or rectangular oil vent holes 21 arranged side by side along the peripheral direction of the web 5, as shown in FIG. 3A. In case of a steel oil ring, the number of the oil vent holes can be considerably increased in comparison with cast iron oil ring, because of a large strength of the steel material. The oil vent holes 21 connect the outer peripheral channel 15 and the inner peripheral groove 17 so that the spaced oil received in the outer peripheral channel 15 can flow into the inner peripheral groove 17. The large number of oil vent holes ensures a smooth passage of the scraped oil. The oil then passes through spaces between turns of coil expander 40 and comes into the piston 50 through oil drain holes (not shown) provided therein. The oil ring is preferably, of a symmetrical shape with respect to the peripherally extending center line L (FIG. 3B) of the web 5.

The coil expander 40 consists of a wound coil of round wire 43 having a sectional shape presenting a part of a circle, as shown in FIG. 1. The wire 43 has advantageously a flat contacting surface 45 which comes in surface contact with the inclined flat surfaces 11A and 11B of the oil ring, for the purpose of increasing the contact surface area, thus decreasing the pressure acting on the oil ring at the two contact points, as mentioned before. Alternatively, the wire 43 can be of rectangular or square or the like. The coil expander 40 is located in the groove 17 of the oil ring 1 and bears against the oil ring 1 at two points. The coil expander 40 presses the oil ring against the cylinder wall 61. According to the present invention, the coil expander 40 comes into contact with the inclined surfaces 11A and 11B of the oil ring at two points, rather than considerable surface contact as in the prior art. According to the present invention, the coil expander 40 does not contact the web 5 of the oil ring 1, but is spaced therefrom by a slight gap 19. The web 5 is, preferably, provided with a recess 18 which provides the gap 19 and which has round corner edges 18'. The round edges 18' are more preferable than angular or sharp edges, since the angular or sharp edges tend to crack due to concentration of internal stress. The outer periphery of the coil expander 40, i.e., of the coil, is preferably treated for wear resistance, such as by chrome plating or nitriding (including sulfurized-nitriding), shown at 41 in FIG. 1. By the presence of the gap 19, the scraped oil can easily flow into the inner groove 17 through the oil vent holes 21.

Preferably, the oil ring 1 of the present invention is made of steel, such as SWRS, SWRH, SWOSC, SWOCV, SK, SUP, or SUS (which are represented by Japanese Industrial Standard). The oil ring can be easily manufactured from a steel strip or a steel wire, bar, or rod having a uniform sectional shape by a usual drawing or rolling method. The blank drawn or rolled into a predetermined shape corresponding to that shown in FIG. 1 is hardened by heat treatment. The oil vent holes 21 can be formed by a punching process, usually before the blank is hardened. Alternatively, punching of the oil vent holes can be effected even after the blank is hardened, since the thickness of the web of a steel oil ring is smaller than that of the web of cast iron oil ring. After the oil vent holes 21 are punched, the blank is rolled and is then cut at a predetermined length to form annular oil rings.

As is well known, if the oil vent holes are formed by milling, as in case of a cast iron oil ring, burrs tend to be produced at edges of the holes and it is difficult to obtain a uniform thickness of the web because the thickness of the portions of the web adjacent to the holes tend to be larger than that of the remaining portions due to non-uniform internal stress. The burrs easily detach during the operation of the engine and enter between the cylinder wall and the piston ring, which results in engine trouble. Punching of oil vent holes is, however, free from these disadvantages.

The present invention offers the following additional advantages, listed hereinbelow by way of reference.

1. Thinner web, resulting in a lighter weight oil ring, due to greater strength of steel.
2. Greater flexibility and followability of oil ring with respect to a cylinder wall, due to thinner web.
3. Larger diameter coil expander, due to two-point contact, rather than considerable surface contact, and due to the thinner web.
4. Smaller spring factor of coil expander, due to larger diameter coil expander, resulting in small extent of decrease of the spring pressure in use.
5. Greater resistance to deformation and distortion both during installation into piston and use, due to decreased internal stress, resulting from punching of oil vent holes rather than milling.
6. Overall greater resistance to wear and easy attainment of circularity of oil ring and flatness of upper and lower surfaces of the side rails, difficult with cast iron oil rings, by milling of oil vent holes, due to thinner web and single punching process of oil vent holes, thus preventing increased oil consumption.
7. Easy obtainment of a higher precision sectional profile of oil ring, due to drawing or rolling of steel oil ring.
8. Smaller flat bearing surface of side rails sufficient to obtain a required unit pressure against the cylinder wall, due to use of steel.
9. Overall smaller size of oil ring, resulting in possible wider use, for example even to a smaller piston as in a two-wheeled vehicle, such as a motorcycle.

The coil expander can be replaced by a so-called equalizer spring in the present invention. In such an alternative, the equalizer spring is provided with flat surfaces which come into contact with the inclined flat surface 11A and 11B.

Figure 5:
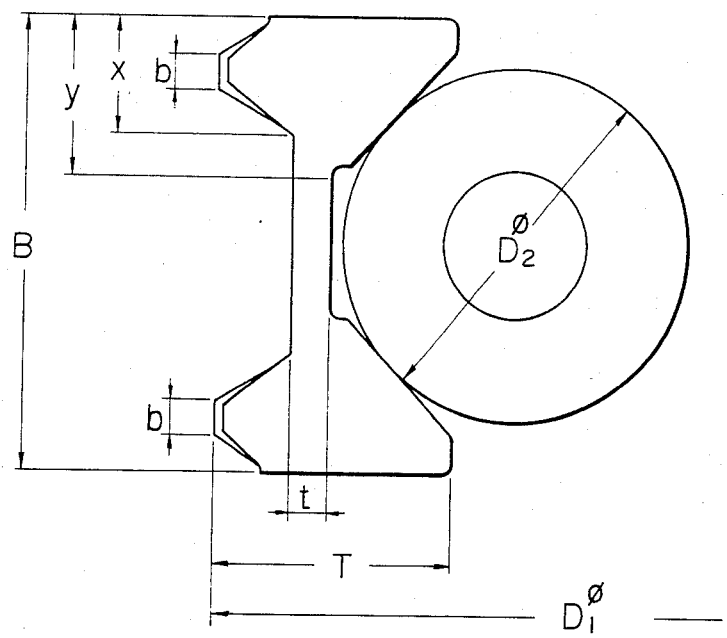
FIG. 5 is a view showing the dimensional relationship of an web and side rails, of a oil ring, and a coil expander.

The following table shows three examples of actual sizes of the product for gasoline, diesel, or other multipurpose engines according to the present invention. The marks used in the table connotes as follows (see FIG. 5)

|  | (unit: mm) | | | | | | | |
|---|---|---|---|---|---|---|---|---|
|  | $D_1^\phi$ | B | T | b | t | $D_2^\phi$ | x | y |
| 1st | 68 | 3.5 | 2.2 | 0.30 | 0.45 | 2.5 | 0.93 | 1.04 |
| 2nd | 90 | 4.0 | 2.4 | 0.30 | 0.45 | 2.8 | 0.89 | 1.29 |
| 3rd | 105 | 5.0 | 2.8 | 0.35 | 0.55 | 3.8 | 1.15 | 1.49 |

$D_1^\phi$ — outer diameter of the oil ring
B — width of the oil ring
T — radial thickness of the oil ring in section
b — width of the outermost bearing surface of side rails
t — thickness of web
$D_2^\phi$ — diameter of the coil expander
x — bottom length of trapezoid of the side rails
y — length of the bottom of inclined flat surfaces Usually, the thickness of a web of a cast iron oil ring cannot be below 0.8 mm. According to the present invention, the thickness t of the web is below 0.8 mm, which increases flexibility and followability of the piston ring with respect to the cylinder wall, as mentioned before. The thickness t of the web must be larger than a certain value to provide a necessary strength of the oil ring. It has been experimentally confirmed that "t" is preferably within the range of 0.3 mm $\leq t \leq$ 0.8 mm.

Further, it has been also experimentally confirmed that relationships of $2.5 \leq x/b \leq 8.0$ and $2.0 \leq y/t \leq 5.5$ gave a good result with respect to the amount of the flat bearing surfaces of the side rails of the oil ring and to the oil consumption.

Figure 6:
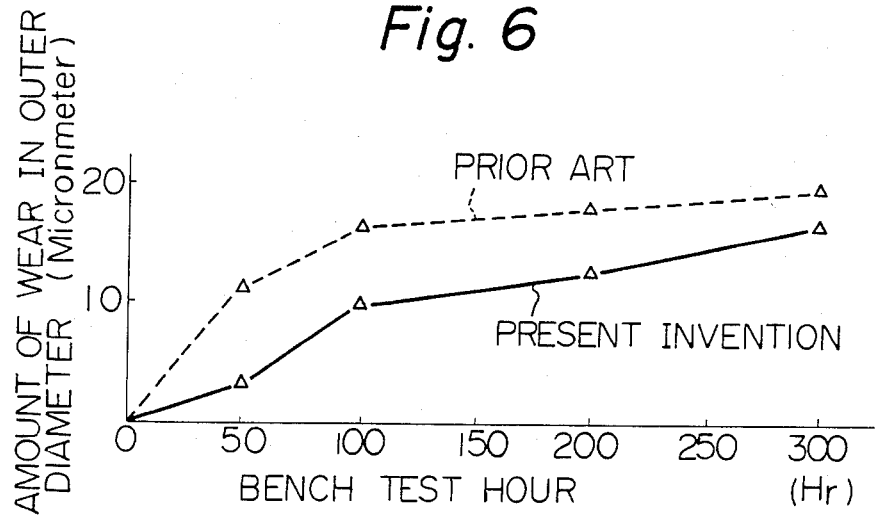
FIG. 6 is a diagram showing the amount of wear of an oil ring according to the present invention, in comparison with a prior art oil ring.
Figure 7:
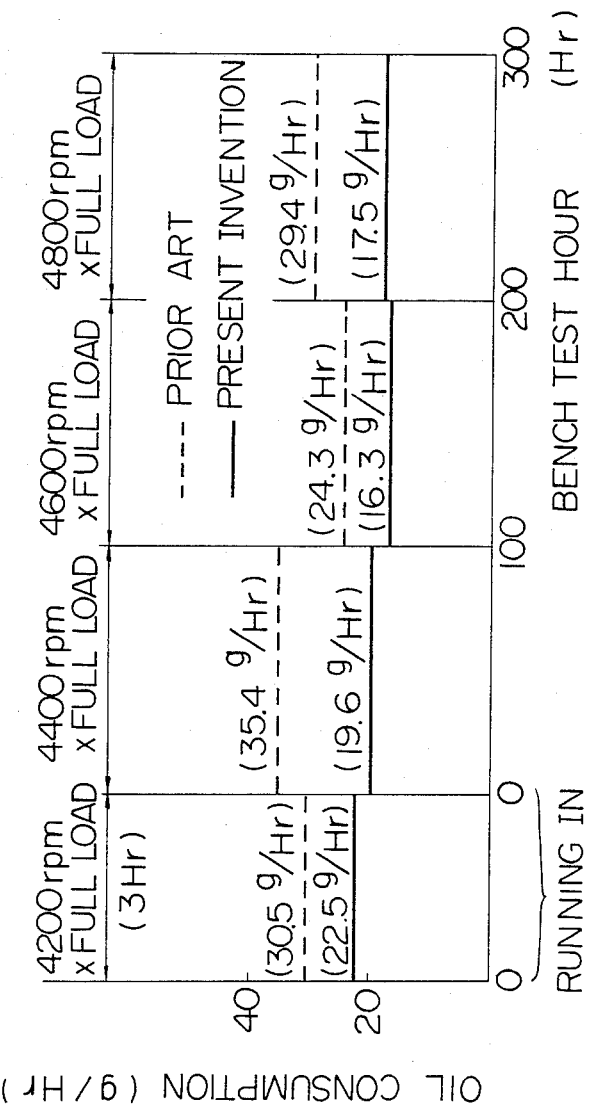
FIG. 7 is a diagram showing the oil consumption of an oil ring according to the present invention, in comparison with prior art.

FIGS. 6 and 7 show experimental results of the amount of wear of the oil ring and the oil consumption in the present invention and prior art. In FIG. 6, as prior art, an oil ring which is made of cast iron and which has an archwise inner peripheral surface with which a coil expander is brought into contact without a gap between the inner peripheral surface and the coil expander was used. As a product of the present invention, the second example of the table mentioned before was used.

As can be seen from FIG. 6, the amount of wear in the present invention is smaller than that of prior art.

In FIG. 7, the oil consumption of a combination of piston rings having first (top) and second compression rings and one oil ring was measured. The same top and second compression rings were used for the present invention and prior art. The oil rings used in the experiments shown in FIG. 7 are the same as those used in FIG. 6. The measurements before the endurance run and during a 100 hour endurance run, 200 hour endurance run, and 300 hour endurance run are mean values. As can be seen from FIG. 7, oil consumption can be decreased in the present invention, in comparison with prior art.

The particulars of the engine used in the experiments were as follows;

four-cycle diesel engine having a displacement of 2188 cc

I claim:

1. A piston ring comprising:
an oil-scraping oil ring, made of steel, having a generally I-shaped cross-section consisting of upper and lower side rails which are mass of rigidity and a thin web for connecting the upper and lower side rails, the thickness of said web being not more than 0.8 mm, said web having a large number of oil vent holes punched along a periphery thereof, said upper and lower side rails and web defining an outer peripheral channel for receiving oil scraped and an inner peripheral groove for receiving a coil expander, said side rails having inclined flat surfaces, in the cross-section, converging to a peripherally extending center line of the web, so as to define the trapezoidal inner peripheral groove, said annular coil expander located in said inner peripheral groove and bearing against the upper and lower side rails substantially at two points, in the cross-section, said coil expander being spaced from the web of the oil ring to provide a slight gap therebetween.

2. A piston ring according to claim 1, wherein said web has a thickness t wherein 0.3 mm $\leq t \leq$ 0.8 mm.

3. A piston ring according to claim 2, wherein each of said upper and lower side rails has a peripheral outer end, in the cross-section, having a substantially trapezoidal section, having a narrow flat outer peripheral bearing surface and presenting sharp edges for effective oil scraping.

4. A piston ring according to claim 1 wherein extensions of said inclined flat surfaces intersect at an angle of at 60° to 120°.

5. A piston ring according to claim 4, wherein extensions of said inclined flat surfaces intersect at an angle of 90°.

6. A piston ring according to claim 3, wherein said peripheral outer ends of the side rails are treated for wear-resistance.

7. A piston ring according to claim 3 wherein said peripheral outer ends of the side rails are provided with grooves which are filled with a wear-resistant material.

8. A piston ring according to claim 1 wherein said inclined flat surfaces of the side rails are treated for wear-resistance at least the portion of the inclined flat surface that comes into contact with the coil expander.

9. A piston ring according to claim 1, wherein said coil expander comprises a wound coil having a flat surface which comes into contact with the inclined flat surfaces of the oil ring.

10. A piston ring according to claim 9, wherein said coil expander is treated for wear resistance.

11. A piston ring according to claim 1 wherein said web of the oil ring has a recess which provides a slight gap between the coil expander and the web of the oil ring.

12. A piston ring according to claim 3, wherein said side rails have an outer most bearing surface width b, said coil expander comprising a wound coil having a flat surface which comes into contact with the inclined flat surface of said oil ring, said side rails having a bottom length of trapezoid x and said inclined surfaces having a bottom length y, wherein $2.5 \leq x/b \leq 8.0$ and $2.0 \leq y/t \leq 5.5$.

* * * * *

UNITED STATES PATENT OFFICE
CERTIFICATE OF CORRECTION

Patent No. 4,522,412      Dated June 11, 1985

Inventor(s) Yukihiko Kubo

It is certified that error appears in the above-identified patent and that said Letters Patent are hereby corrected as shown below:

Name of Assignee:

"Keikoku Piston Ring Co., Ltd." should be --Teikoku Piston Ring Co., Ltd.--

Signed and Sealed this

Twenty-sixth Day of November 1985

[SEAL]

Attest:

DONALD J. QUIGG

Attesting Officer      Commissioner of Patents and Trademarks